July 4, 1933.  J. M. CUNNINGHAM  1,916,966
GANG PUNCH
Filed May 6, 1930  10 Sheets-Sheet 2

FIG. 2.

Inventor
J. M. Cunningham
By his Attorney
W. M. Wilson

FIG. 3.

July 4, 1933.　　　J. M. CUNNINGHAM　　　1,916,966
GANG PUNCH
Filed May 6, 1930　　　10 Sheets-Sheet 5

Inventor
J. M. Cunningham
By his Attorney
W. M. Wilson

July 4, 1933. J. M. CUNNINGHAM 1,916,966
GANG PUNCH
Filed May 6, 1930 10 Sheets-Sheet 7

Inventor
J. M. Cunningham
By his Attorney
W. M. Wilson

July 4, 1933. J. M. CUNNINGHAM 1,916,966
GANG PUNCH
Filed May 6, 1930 10 Sheets-Sheet 8

Inventor
J. M. Cunningham
By his Attorney
W. N. Wilson

July 4, 1933. J. M. CUNNINGHAM 1,916,966
GANG PUNCH
Filed May 6, 1930 10 Sheets-Sheet 9

Inventor
J. M. Cunningham
By his Attorney
W. M. Wilson

July 4, 1933. J. M. CUNNINGHAM 1,916,966
GANG PUNCH
Filed May 6, 1930 10 Sheets-Sheet 10

Inventor
J. M. Cunningham
By his Attorney
W. M. Wilson

Patented July 4, 1933

1,916,966

UNITED STATES PATENT OFFICE

JAMES MASON CUNNINGHAM, OF ENDICOTT, NEW YORK, ASSIGNOR TO THE TABULATING MACHINE COMPANY, OF ENDICOTT, NEW YORK, A CORPORATION OF NEW JERSEY

GANG PUNCH

Application filed May 6, 1930. Serial No. 450,130.

This invention pertains to machines for performing gang punching operations on perforated record cards such as are used in tabulating machines. For some purposes, in connection with tabulating machine accounting, it is necessary to have a number of duplicate cards punched exactly alike.

This is accomplished by first punching a single card by the usual key operated hand punch, and then placing that card in a machine of the type disclosed in the present invention which will duplicate the pattern card in any desired quantity, punching the cards one at a time until the predetermined number has been punched. All holes are punched in each card at a single operation by a plurality of punches.

The general object of the present invention is to provide such a gang punch of simple and substantial design, economical to manufacture, and satisfactory in the hands of the operator, and is more particularly directed to improvements in the gang punch disclosed in copending application of C. D. Lake and R. E. Page, Serial No. 63,830, now Patent No. 1,817,631.

One object is to provide means for automatically printing a number on each card, in which the number printed on the card bears no relation to the data perforated thereon.

A further object is to provide electrical control devices for rendering the numbering device operative whenever a card is properly located to receive an impression.

A still further object is in the provision of interchangeable structure which permits the shifting of the numbering device to print in various positions on the card.

Another object is the provision of a simplified electrically controlled device which may be preset to stop the machine when a predetermined number of cards have been printed and punched.

Another object resides in the novel structure of the punches and cooperating dies to permit the perforating of rectangular holes in the card.

Another object of the invention is to provide means for printing on a card data corresponding to perforations made therein in a subsequent cycle of operations.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

Figure 2:
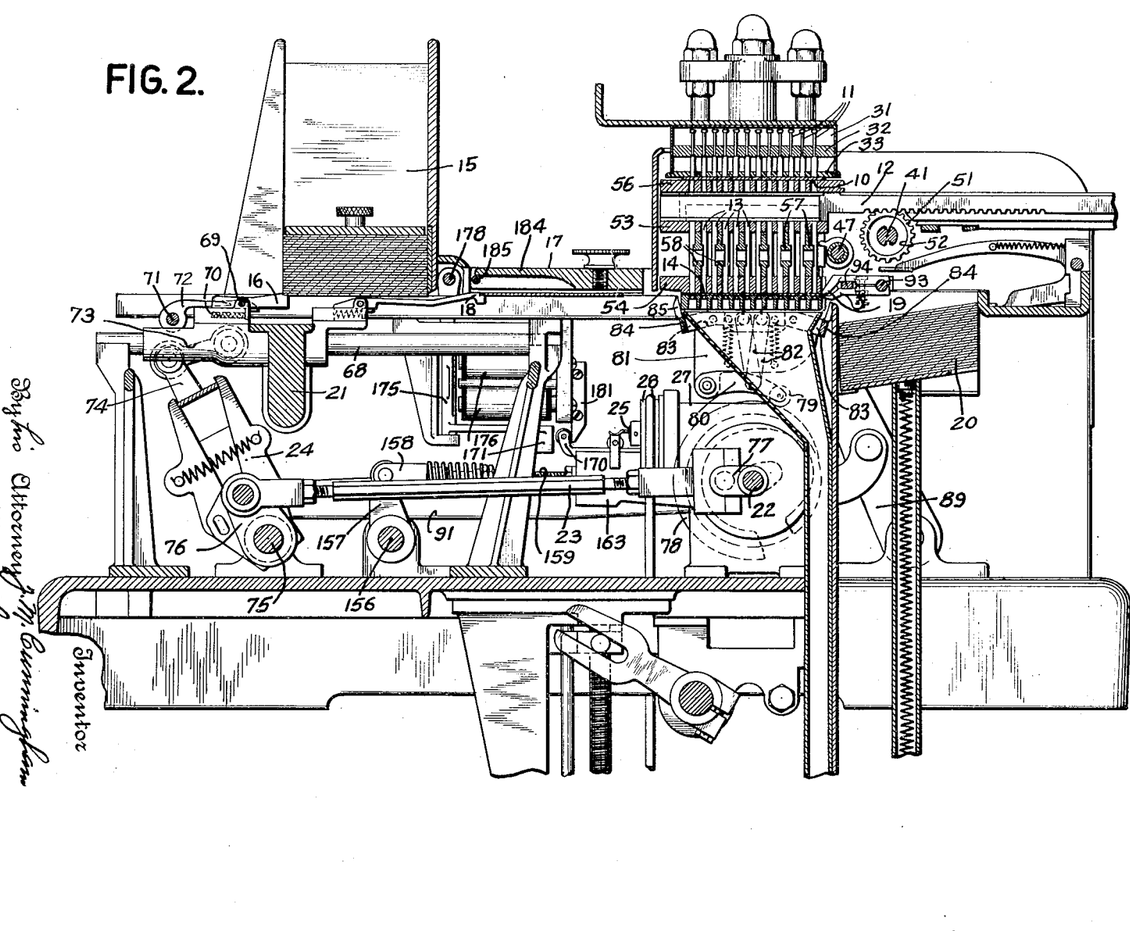
Fig. 2 is a sectional view of the machine.

A general understanding of the machine and its operation may be obtained from Fig. 2. The pattern card 10 is placed in position underneath pattern pins 11. All pins that register with holes in the pattern card drop through the perforations and cooperate with interposer bars 12 to render effective the proper punches 13 to perforate the blank card 14 then between the die plates.

The blank cards are fed one by one from magazine 15 by picker 16 to a printing position 17 and from thence by picker 18 to a position under the punches and, after punching, the card is removed by nippers 19 and deposited on the discharge stack 20.

The pickers are reciprocated by frame 21 actuated from shaft 22 by connecting rod 23 and arm 24. Power for the whole machine is supplied by a motor beneath the base (not shown), which drives shaft 22 through shaft 25 (see Fig. 4) and worm gears 26 contained within gear box 27. Belt and pulley 28 connect shaft 25 to the motor. When the predetermined number of cards has been printed and punched, the machine is stopped by the control device designated generally as 29 in Fig. 1.

We will now describe in detail the construction and operation of the various component parts of the machine.

*Insertion of the pattern card*

There is one pattern pin 11 for each index position in the card, so when the pattern card 10 is in position, one pin 11 rests on, or passes through, each index position. The pattern pins are contained in the pin box 31 (Figs. 2, 4 and 12) and are supported by upper and lower plates 32 and 33 respectively, in which plates the pins move freely vertically.

The pattern card is exactly located by fixed pins in a manner well explained in the copending application referred to.

All pins 11 that find perforations in the pattern card drop through the holes until their enlarged upper portions rest on lower plate 33, in which position the lower ends of the pins are in position to cooperate with the interposer bars 12 as will be later explained.

Figures 12, 13, 14, 15:
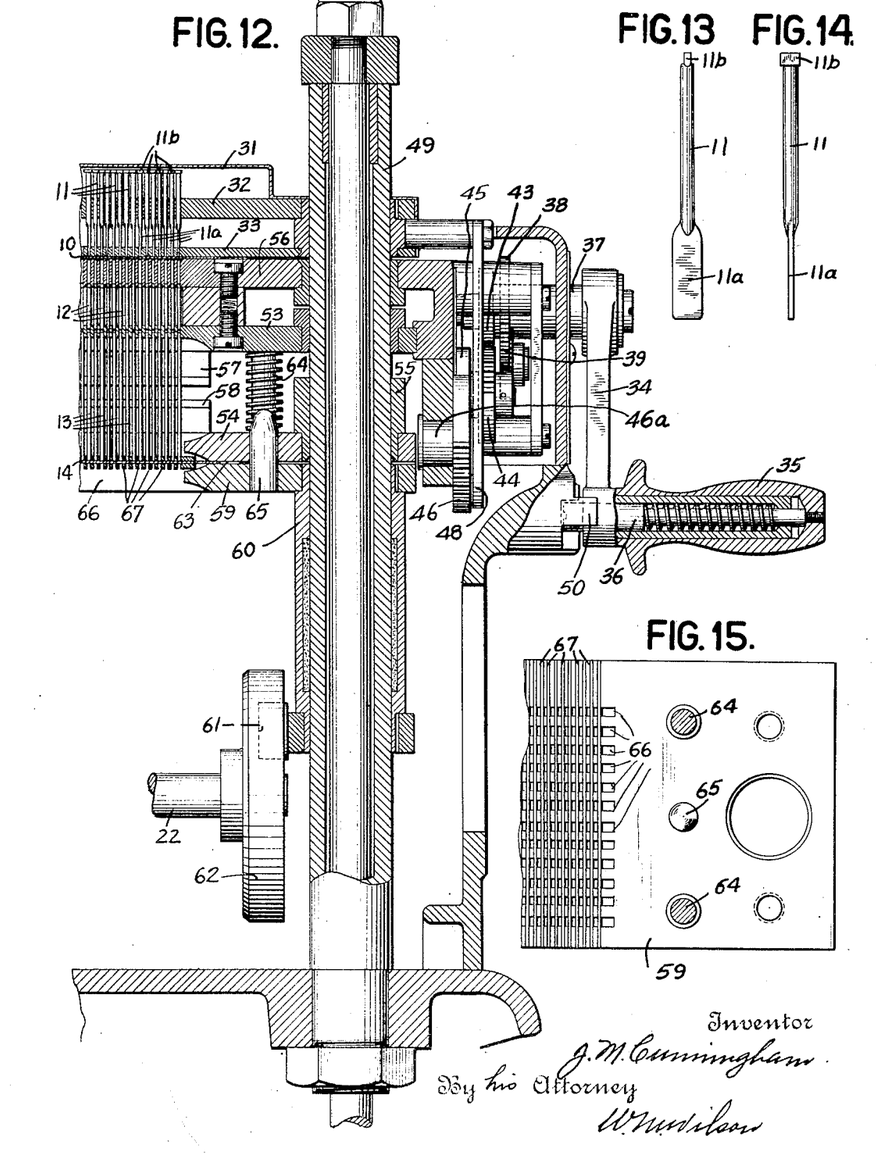
Fig. 12 is a section taken on line 12—12 of Fig. 1.
Fig. 13 is a detail of a card sensing pin.
Fig. 14 is a further detail of a card sensing pin.
Fig. 15 is a detail of the die plate.
Figure 19:
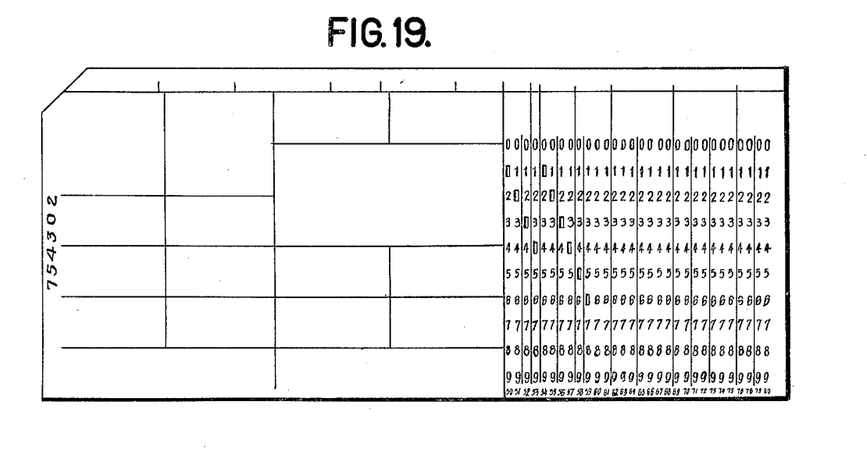
Fig. 19 is a card.

In Figs. 13 and 14 the pin 11 is shown as having a flattened lower end 11a and a flattened head 11b. The holes in the pattern card with which the pins 11 cooperate are rectangular in shape, and closely spaced as shown in Fig. 19. The ends 11a are therefore constructed to permit registration with the rectangular holes in the card and also to permit of the close spacing necessary in order to pin-box each column on the card.

Figure 1:
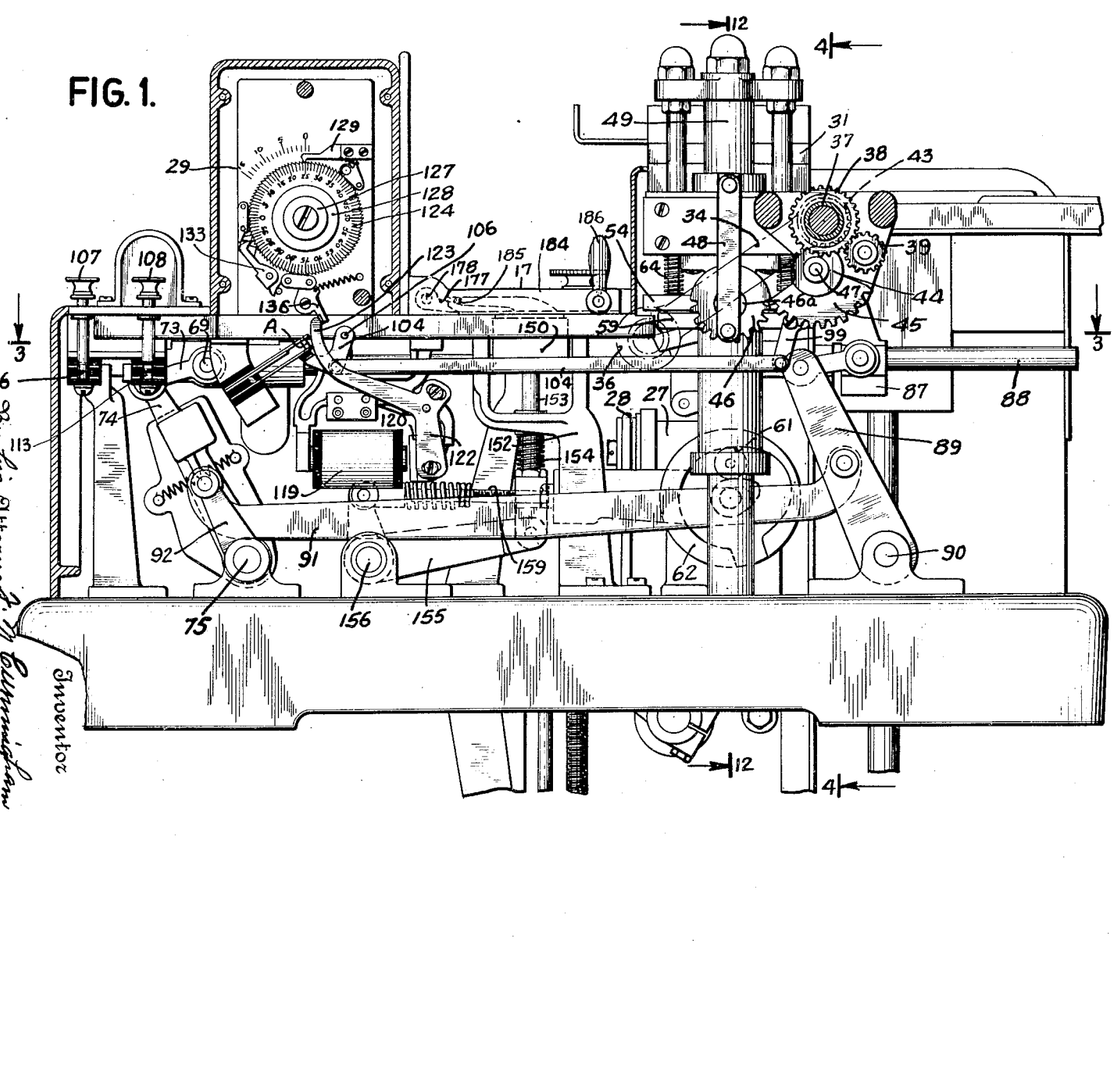
Fig. 1 is an outside view of the assembled machine.

To place the pattern card in position, hand crank 34 is moved counterclockwise by means of handle 35 which is normally locked in the position shown in Fig. 1 by means of spring pressed plunger 36 contained within the handle (see Fig. 12).

During the first half of the movement of crank 34 all interposer bars 12 are retracted to their home positions, and during the second half of the crank movement the pin box and pattern pins are raised to the position shown in Fig. 12 so the pattern card may be inserted from the right. This movement of pin box and interposers is brought about as follows: Crank 34 is fast on sleeve 37, as is also gear 38 (Fig. 12). In mesh with gear 38 is pinion 39 integral with sleeve 40 which is mounted on interposer shaft 41. The inner end of sleeve 40 is provided with a clutch jaw 42 (Fig. 4) which engages a cooperating lug on a collar fast on shaft 41.

Integral with gear 38 is a gear 43 which has teeth cut in only part of its circumference. These teeth are adapted to mesh with the teeth of a mutilated gear 44 to which is secured a segmental gear 45 meshing with a gear 46 mounted on stud 46a. Gears 44 and 45 are fast on a shaft 47 which extends across the machine and carries at its other end similar gears meshing with similar gears 43 and 46 respectively. Each gear 46 has eccentrically pivoted thereto a link 48 the upper end of which is pivotally connected to pin box 31 (Figs. 1 and 12).

Tracing out the operations effected by the handle 34, during the first half of its counterclockwise movement in Fig. 1, the shaft 47 is rotated to cause retraction of interposer bar 12 in a manner to be explained. Continued counterclockwise turning of the handle will cause gear 43 to engage gear 44 and through the mechanism traced raise pin box 31 vertically, guided by fixed tubular supports 49 (see Figs. 4 and 12). The handle 34 is prevented from making a complete revolution by engagement with a projecting lug 50, to insure that the teeth of gear 43 do not pass out of engagement with gear 44. With the pin box 31 raised and bars 12 retracted to the right, the pattern card 10 may be inserted. Reversing the direction of rotation of handle 34, the gearing described will lower the pin box 31 and thereafter the shaft 41 is rotated carrying the interposer bars 12 into contact with those pins which passed through the pattern card. At the completion of this clockwise stroke of the hand crank it is locked in position by plunger 36 and the machine is ready to operate.

Figure 4:
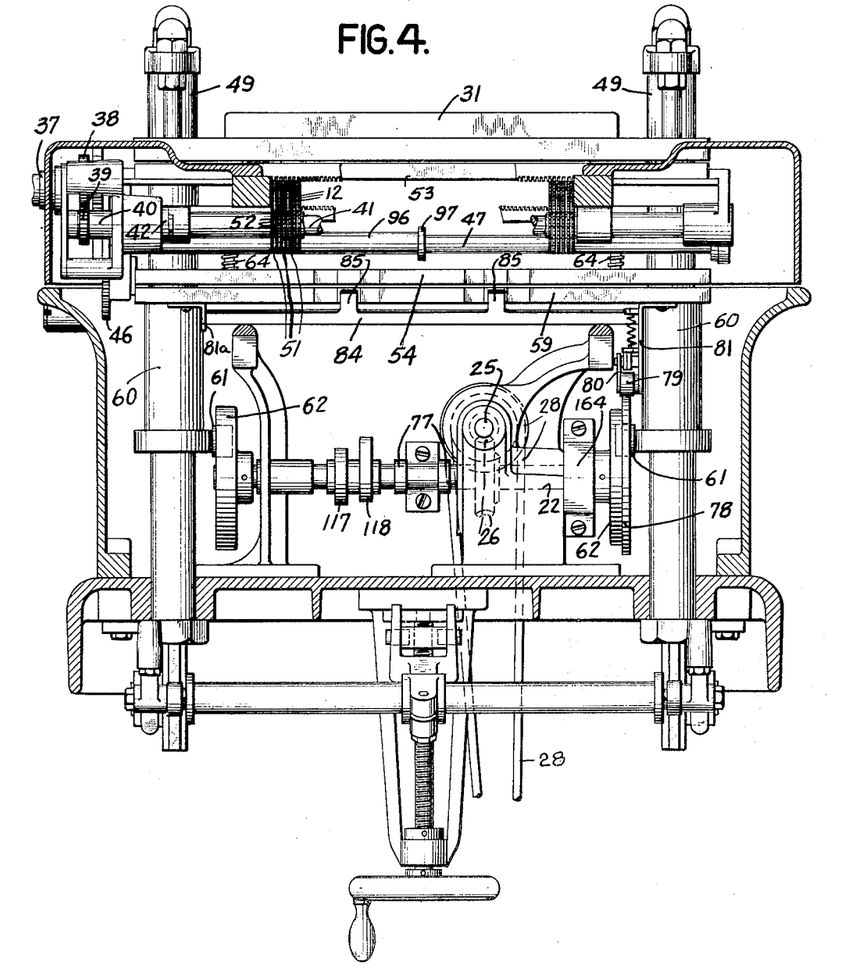
Fig. 4 is a sectional view on line 4—4 of Fig. 1.

The method of actuating interposer bars 12 may be understood from Figs. 4 and 12. Each bar 12 has rack teeth cut on its underside, and each rack is in mesh with a gear 51, free to turn on shaft 41. Gears 51 are mounted on shaft 41 with friction disks 52 between the gears. The shaft is splined and each friction disk has projections fitting into the splines, so the disks must turn with the shaft. A coil spring contained within sleeve 40 serves to press the assembly of gears 51 and disks 52 together so when shaft 41 rotates, gears 51 are driven by friction with disks 52. If any gear meets sufficient resistance to overcome friction with the disks it will stop, while the disks in contact with it will continue to turn with the shaft. Thus, when the interposer bars 12 are moved to the left by gears 51 during the second half clockwise revolution of hand crank 34 after the pin box has been lowered, any bar 12 which encounters a pattern pin will be arrested, while all those which do not encounter pins will pass on to the dotted position where they are ineffective.

Any bar stopped by a pattern pin has its upwardly projecting shoulder against the pin, while its downward projection is directly over the punch 13 corresponding to the pattern pin above it. There is an interposer bar for each index column on the card.

Punches

The punches 13 are guided at their upper ends by plate 53, (Figs. 2 and 12) and at their lower ends by plate 54. Upper plate 53 is fixed in position and is grooved on its upper side to guide the interposer bars 12. Lower plate 54 is movable vertically, being guided by bushings 55 on columns 49. Grooved plate 56, fast to plate 53, serves as the upper guide for the interposer bars.

Fast to upper guide plate 53 is a series of downwardly projecting T-bars 57, and fast to the lower guide plate 54 is a corresponding series of upwardly projecting T-bars 58. Each punch 13 is notched on its side and the above mentioned T-bars are so located between the punches that every punch 13 engages, by means of its notch, both an upper and a lower T-bar, as is shown in Fig. 2.

Die plate 59 is supported and guided for vertical movement by sleeves 60 (see Fig. 4) fitted to columns 49. On the lower end of sleeves 60 are fitted cam followers 61 rolling in box cams 62, mounted on shaft 22 and so timed as to give sleeves 60 and die plate 59 one up and down reciprocation every card cycle.

At the bottom of the stroke of the die plate it is separated from guide plate 54 sufficiently to allow the card 10 to be readily slipped between them. At this time plate 54 is resting on guide plates 63 (Fig. 3), which limit the downward travel of the plate.

Plate 54 is spring pressed downwards by four helical springs 64. Die plate 59 is guided relatively to plate 54 by dowel pins 65 fast in 59 and sliding snugly in holes drilled in 54.

After the blank card 14 is in position on die plate 59, cam 62 forces die plate 59, lower guide plate 54, and the card, upwardly. The punch directly underneath a projection of interposer bar 12 is prevented from moving upwardly and is forced through the card, making a perforation corresponding in location to the hole directly above it in the pattern card. All unrestrained punches are borne freely upwardly by card 14 and punch no holes. As cams 62 continue their rotation, all punches and parts previously forced upwards are restored to their home position, being forced downwardly by their own weight, by springs 64, and by the outer face of box cam 62 acting on roller 61. During this downward motion all punches are restored to their home positions by T-bars 57 and 58.

As there is an interposer bar 12 for every column on the card and a pattern pin 11 with its corresponding punch 13 for every index position in each column, it is evident that the above described operation punches card 14 as an exact duplicate of pattern card 10.

Referring to Fig. 19, the holes punched in the card are seen to be of rectangular outline. The punches, necessarily must be of similar cross section as must also be the cooperating guides and die plates. In Figs. 12 and 15, the die 59 has a series of slots 66 cut thereon in a lengthwise direction. Transversely to the slots 66 are cut shallow slots in which are inserted strips 67 forming the rectangular openings as shown. Strips 67 may be secured in place by staking or prick-punching or other well known means. Similar structure is employed to obtain the openings in the plates 53 and 54.

Card feeding mechanism

Figure 3:
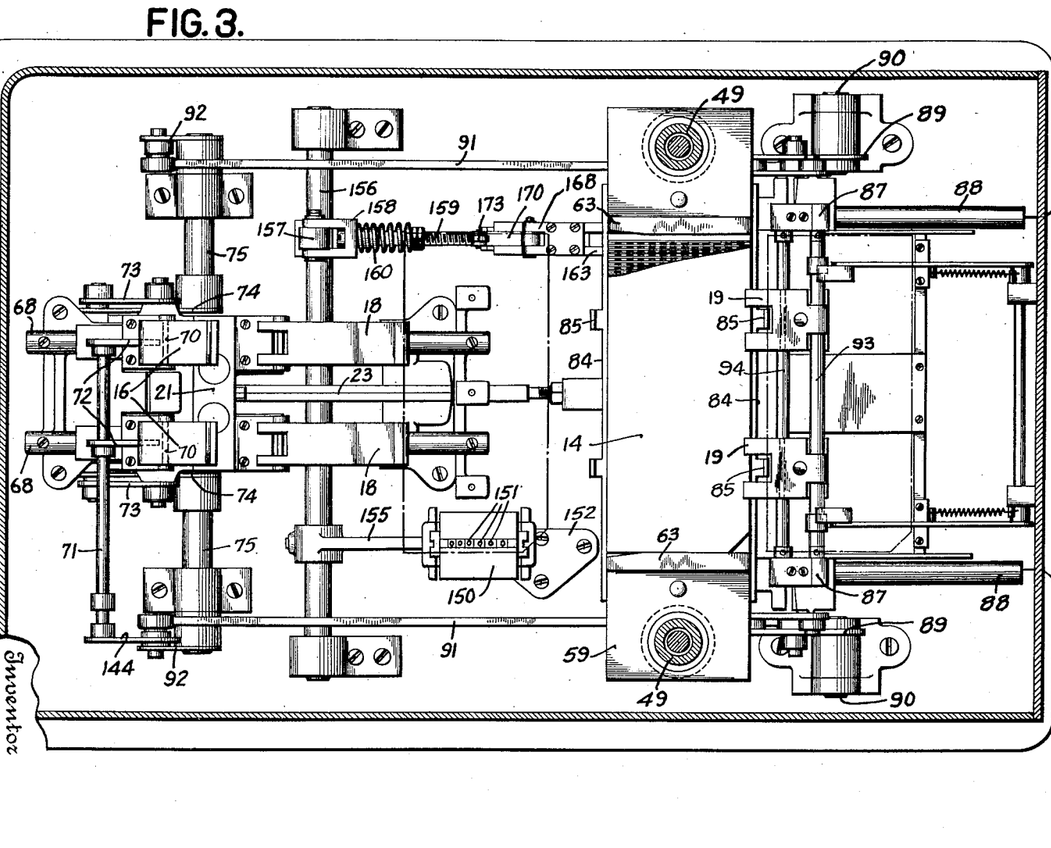
Fig. 3 is a plan section of the card advancing devices taken on line 3—3 of Fig. 1.

The card feeding apparatus may be understood by reference to Figs. 1, 2 and 3. The blank cards are placed in magazine 15 and are fed one by one from the bottom of the stack by a pair of pickers 16 which are pivotally mounted on frame 21 extending crosswise of the machine and slidable on rods 68.

Figures 9, 10, 11:
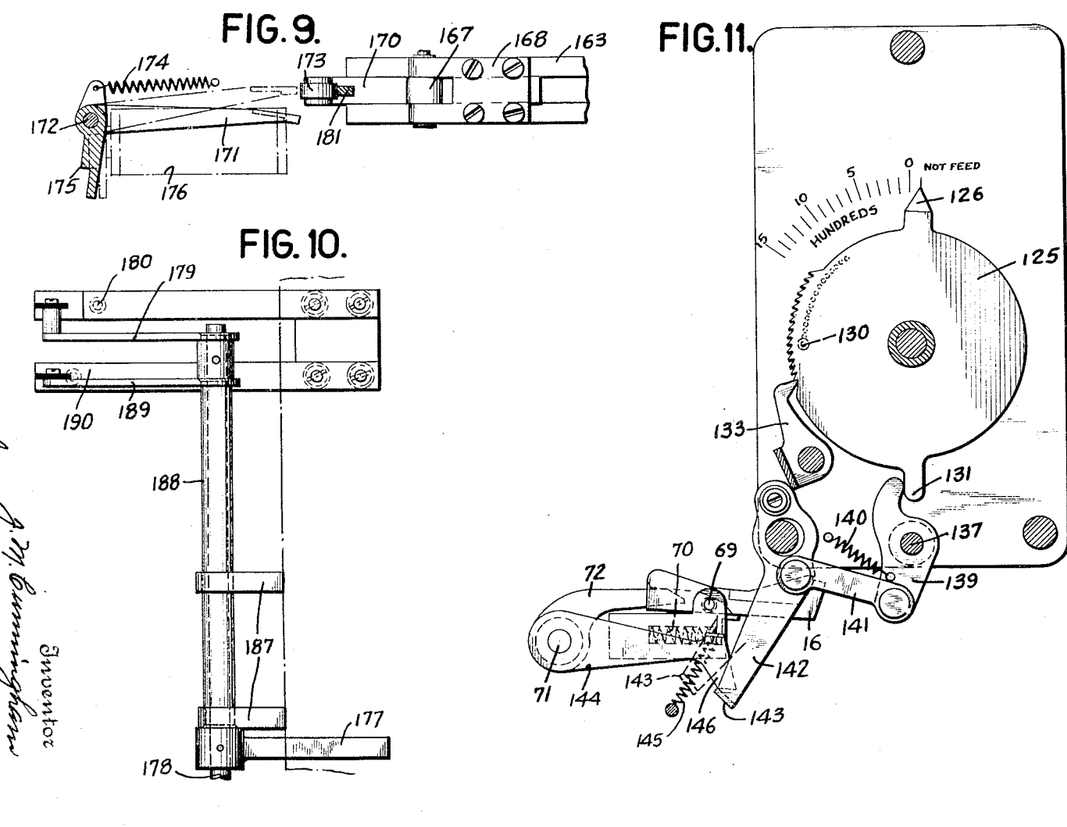
Fig. 9 is a detail section taken on line 9—9 of Fig. 6.
Fig. 10 is a plan detail of the card levers and associated contacts.
Fig. 11 is a further detail of the card counting mechanism.

Pickers 16 are pivoted at 69 and are pressed upwardly against the cards by coil spring 70 acting on the angle piece on the under side of picker 16 (Fig. 11).

Under certain conditions it is desired to automatically stop feeding cards. This is accomplished by rocking shaft 71 slightly counterclockwise, thus causing the fingers 72 mounted on shafts 71, to raise the rear end of the picker as shown in Fig. 11, in which position the picker 16 will miss the cards entirely when reciprocated. How this is done will be later explained.

Pivotally attached to frame 21 are links 73 which are connected to arms 74 loose on shaft 75 and having resilient driving connection to arm 24 secured upon the shaft. Shaft 75 is oscillated through an arm 76 which is connected by rod 23 to a crank 77 on shaft 22.

As shaft 22 revolves crank 77 through connecting rod 23, rocks arms 24 and 74 back and forth and through links 73 reciprocates frame 21 and pickers 16. Pickers 16 advance the card from the bottom of magazine 15 to the printing position 17 from which position pickers 18 advance the card to the punching position. Pickers 18 are on frame 21 mounted in a manner similar to pickers 16 and travel therewith.

The picker mechanism just described carries the card forward to approximately its proper position on the die plate. The card is in proper position endwise, being guided by the guide plates 63 (Fig. 3), but owing to changeable momentum of cards due to various conditions, it is necessary to provide additional devices to exactly locate the card sidewise under the punches. This mechanism is shown in detail in Fig. 2. The right hand cam 62 (Fig. 4) has on its outer periphery a cam 78, on which rides a cam follower 79 carried on the outer end of arm 80 pivoted to plate 81 which is fastened to the under side of die plate 59. Extending upwardly from a pivotal connection on arm 80 is a pair of links 82, each connected pivotally at its upper end to the free end of a pivoted horizontal lever 83.

On their outer ends these levers carry bars 84 extending the greater part of the length of die plate 59 as shown in Fig. 4. Bars 84 are each provided with two upwardly projecting fingers 85. At the left side of the machine, pivotal supports are provided in an angle piece 81a fast to die plate 59.

While a card is being pushed into place on the die plate by picker 18, roller 79 is on the high part of cam 78, and fingers 85 are in position shown in Fig. 2, but as soon as the picker has withdrawn and before cams 62 have raised the die plate, roller 79 drops off cam 78 aided by its spring, whereupon fingers 85 snap into position forcing the card 14 to register exactly with die plate 59.

After the card has been punched and while still on the die plate, the forward edge of the card is gripped by the nippers 19, which are mounted on brackets 87, slidable on rods 88 as shown in Fig. 1. Brackets 87 are link-connected to arms 89 (Figs. 1 and 3) pivoted at 90 and connected by links 91 to arms 92 secured to shaft 75. The gripper mechanism is thus reciprocated with the pickers, so that when the pickers begin to feed a new card from the stack the nippers are beginning to withdraw the punched card from the dies, and as the new card takes its place in the printing position 17 the punched card is deposited on the discharge stack, and the card in printing position takes its place under the punches.

The nippers comprise upper and lower jaws, pivoted at their dead ends on cross-shaft 93 and drawn together by a spring. Near their live ends a flattened portion of shaft 94 passes between the jaws. When the flat part of the shaft is horizontal the jaws are drawn to gripping position by the spring, as in Fig. 2, and when the flats are not horizontal the jaws are forced apart.

Fast on both ends of shaft 94 are triggers which contact with adjustable stops as brackets 87 reach the outer end of their stroke. The contact of the triggers against the stops rotates shaft 94 so the flat portions thereof force the nipper jaws apart, and the card is released. At the end of the back stroke of brackets 87 one of the triggers contacts with an adjustable stop, whereupon shaft 94 is snapped into position with its flat portions horizontal and the nipper jaws grip the card as in Fig. 2. This mechanism is more fully disclosed in the application cited and needs no further explanation here.

*Motor control mechanism*

Figures 7, 8:
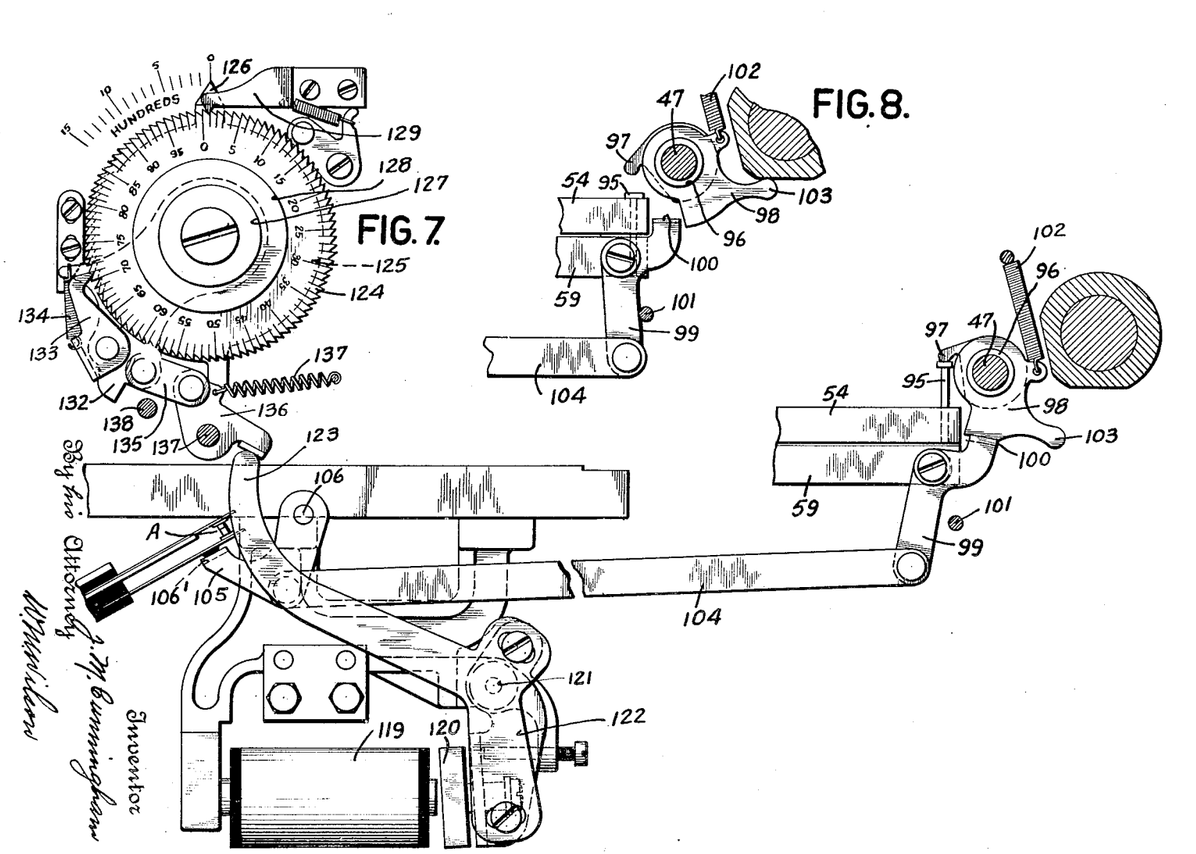
Fig. 7 is an enlarged detail of card counting mechanism.
Fig. 8 is a position view of parts in Fig. 7.

As shown in Fig. 7, lower guide plate 54 of the punching device is provided near its forward edge, with a vertical feeler pin 95, the lower end of which drops through into a clearance hole in die plate 59 if no card be present. In the absence of a card the downward movement of the pin is limited by its head resting on the machine frame.

However, if a card be present, pin 95 rests on the blank margin of the card and the pin is held in an elevated position as shown in Fig. 7.

Shaft 47 crosses the machine adjacent and parallel to the front edges of die plates 54 and 59, and carries a sleeve 96 (Fig. 4). On sleeve 96, midway of the length of shaft 47, is fastened an arm 97, the free end of which rests on the head of pin 95. The rear end of sleeve 96 has, fast to it, a cam shaped member 98. Pivoted on die plate 59 is a bell crank lever 99 having a horizontal projection 100.

Whenever, on its up stroke, die plate 59 carries a card, pin 95 will be raised, and arm 97 will rock sleeve 96 so that cam 98 will be in the path of projection 100 with the result that bell crank 99 will be moved to the left as in Fig. 7.

If there be no card on the die plate when it rises, pin 95 will be in its low position, sleeve 96 will not be rocked, cam 98 will not obstruct projection 100, and bell crank 99 will remain in its position to the right against stop pin 101, as in Fig. 8.

Arm 97 is maintained in contact with the head of pin 95 by spring 102, one end of which is fast to cam 98 and the other end to the machine frame. The rocking motion of sleeve 96 is limited by arm 103 which abuts against the machine frame whenever no card is on the die plate.

Pivotally attached to bell crank 99 is a horizontal link 104, the other end of which is pivotally attached to a member 105, which, in turn, is pivoted on the frame at 106. Member 105 has a projection 106' which serves to keep contact "A" closed whenever bell crank 99 and connected member 104 swing to the left, and permits "A" to open when 99 and 104 are swung to the right, as they will be if no card is on the die plate.

Contact A is adapted to control the operation of the machine in a manner best explained in connection with the wiring diagram of Fig. 18.

Figure 18:
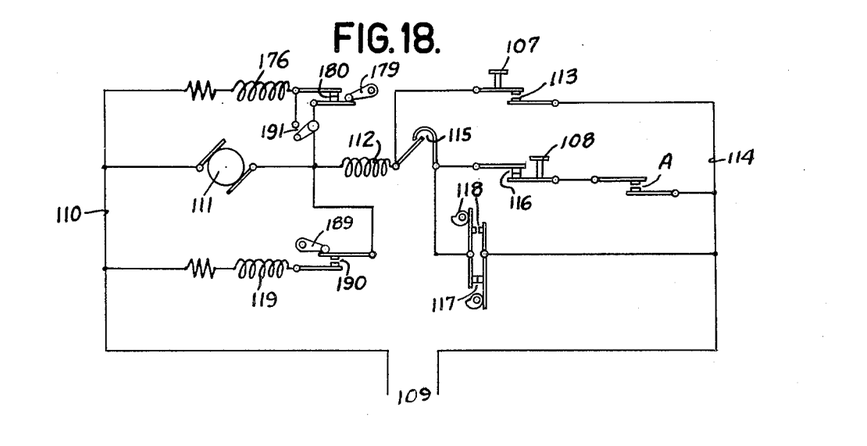
Fig. 18 is a wiring diagram of the electric circuit of the machine.

The machine is started in operation by depressing start key 107 and stopped manually by depressing stop key 108 (Figs. 1 and 18).

Current is supplied from the outside source to the machine circuit at 109, and when key 107 is depressed current flows from left side of line 110 through motor 111, relay coil 112, contact 113, and back to source through line 114. As soon as coil 112 is energized, relay contact 115 is closed and a stick circuit is provided through motor 111, coil 112, contact 115, and by two paths back to line 114. One path is through contact 116 and machine operated contact "A", while the other is through make and break cam contacts 117 and 118. Contacts 117 and 118 are in parallel and contact 117 breaks before contact 118 breaks and contact 118 makes before contact 117 breaks.

The timing of contacts and other operations of the machine are such that contact "A" makes before 118 breaks and holds contact after 117 makes. This means that when A is held open by automatic action of the machine, both A and the cam contacts will be open and the machine will stop at a position between the breaking of contacts 118 and the making of 117. The same is true if the machine be stopped manually by depressed stop key 108, which opens contact 113.

*Card counting mechanism*

The control device designated generally as 29 in Fig. 1 is adapted to stop the machine when a predetermined number of cards have been punched. In Fig. 7, a magnet 119 is adapted upon energization to attract its armature 120 pivoted at 121. To one of the side arms of the armature structure is adjustably secured a member 122 having a curved finger 123 which is used to actuate the mechanism about to be described, which comprises a front dial 124 indicating units and graduated from 0 to 100, and a rear dial 125 (Fig. 11) having a pointer 126 cooperating with a fixed chart indicating hundreds and graduated 0 to 15. the capacity of the mechanism illustrated being 1500 cards. This may be increased or diminished as desired without change of the principle of operation of the device. The hundreds dial may be manually rotated by knob 127 and the units dial by knob 128. Units dial 127 is provided with one hundred evenly spaced notches in its periphery. A spring pressed roller detent cooperates with these notches. Units wheel pointer 129 is fast to the machine frame. The hundreds dial has a ball detent 130 cooperating with a series of holes drilled in the dial. Dial 125 is also supplied in its periphery with sixteen notches spaced the same as the notches in the units dial. The hundreds dial also has a projection 131 from its lower edge.

Supported on the dial hubs is a plate 132 extending outwardly beyond the dials. Pivoted on plate 132 is a ratchet dog 133 held in contact with the notches in the units dial by spring 134 connected at one end to dog 133 and at the other end to a projection on plate 132. Plate 132 is connected by link 135 to lever 136 pivoted on the frame at 137 and contacting at its free end with finger 123. As will be described, finger 123 is rocked every time a card is printed. This rocking motion of finger 123 is transmitted through lever 136 and link 135 to plate 132 and dog 133 so that units dial 124 is rotated one notch for every rocking motion of finger 123, or in other words, for every card printed. Lever 136 is held in contact with 123 by spring 137. A shoulder on plate 132 stops against fixed pin 138. The hundreds dial 125 is slightly smaller in diameter than units dial 124 as may be seen in Fig. 7 in which dial 125 may be seen in dotted outline.

It will be observed that the notch indicating 70 on the units dial is cut deeper than the other notches.

Dog 133 is so located that it drops into notch 70 when the 0 notch reaches indicator 129. Dog 133 is wide enough so that when it drops into the deep notch 70 it also drops into a notch in the hundreds wheel and moves both dials one notch. Below the hundreds dial (Fig. 11) is a vertical lever 139, pivoted at 137. The upper end of 139 is held in contact with the left side of projection 131 of the hundreds dial, by spring 140. Extending from the lower end of lever 139 is a link 141 which is connected at its other end to vertical arm 142 pivoted on the frame, and limited in its travel by a stud fast in the frame and passing through an enlarged opening in lever 142.

The lower end of lever 142 is bent over to form a lip 143 extending under the free end of arm 144 keyed to shaft 71 which carries fingers 72. Arm 144 is drawn downwardly by spring 145. Normally lip 143 is in dotted line position shown in Fig. 11, and arm 144 and attached fingers 70 are drawn down by spring 145 so that fingers 72 do not interfere with the normal card feeding operations of picker 16.

However, when dial 125 is moved to the position shown in Fig. 11, in which pointer 126 is to the right of the zero mark on the chart, then tail 131 moves the upper end of lever 139 to the left which swings arm 142 to its full line position, camming under projection 146 of arm 144 and raising arm 144 and fingers 72, thereby rendering picker 16 ineffective by raising its rear end so that 16 passes freely underneath the cards.

With the above construction in mind, the operation of the automatic stopping mechanism will be readily understood.

If the number of printed and punched cards desired is one hundred or less, dial 124 is set with the desired number opposite indicator 129. Say the desired number is 25. Then 0 on the dial will be 25 notches to the left of indicator 129, and the deep 70 notch will be 25 notches in counterclockwise direction from dog 133. Every time a card is printed, the dial will be moved by dog 133 one notch clockwise, so that when the twenty-fifth card is fed 0 on the dial reaches indicator 129 and dog 133 drops into the 70 notch at the same instant. When this occurs, the dog will also drop into the lowest (first) notch of the hundreds dial as shown in Fig. 11, and will move it clockwise to the "not feed" position so that tail 131 actuates lever 139 and renders the card picker ineffective, as already explained. No more cards being fed, feeler pin 95 will drop through die plate 59 and the machine will stop on account of the opening of contact A, as explained above, after the card in printing position has been punched and advanced to the stacker 20.

*Number printing device*

Figures 5, 6:
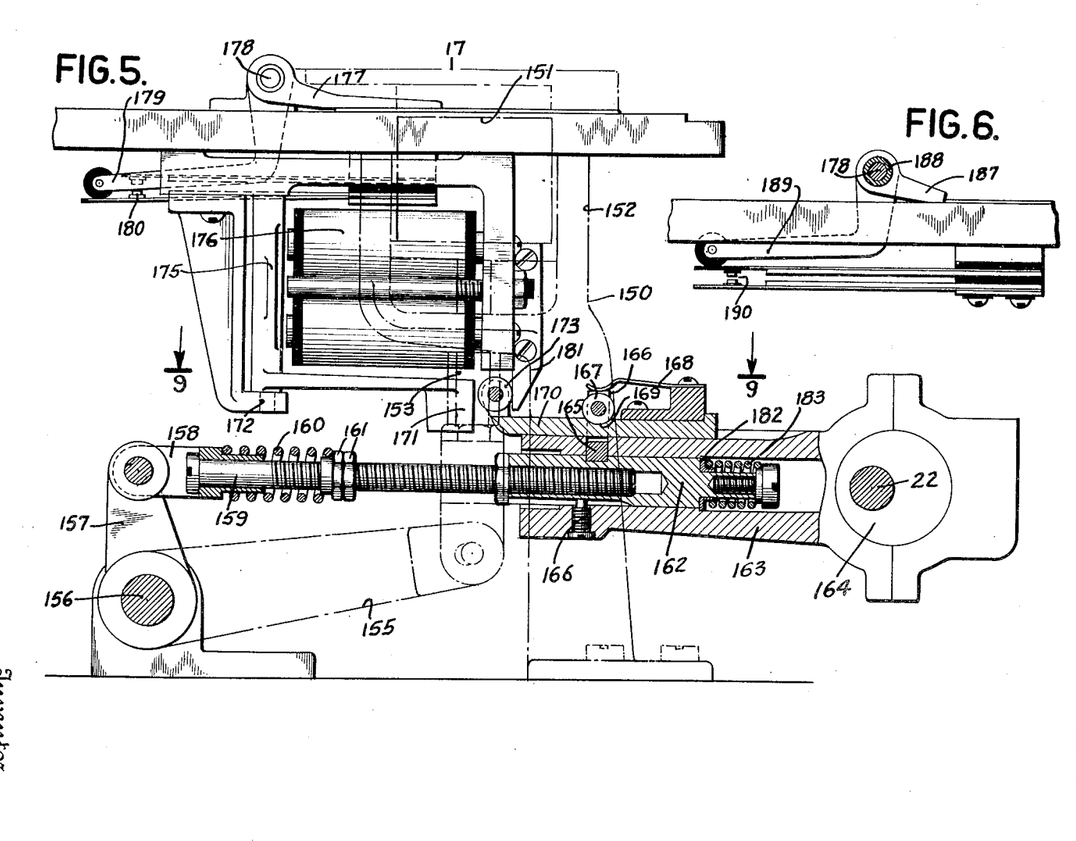
Fig. 5 is an enlarged detail of controlling mechanism for the numbering device.
Fig. 6 is a detail of a card lever contact.

When the card is in the position designated 17 in Fig. 2 it is adapted to be printed upon its under side by a numbering device designated generally as 150 (Fig. 5). This device may be a numbering machine of well known type having a plurality of numbering wheels 151 and a self contained inking device therefor. These wheels are mounted in a reciprocable frame and are adapted, according to the setting of manual levers, to print consecutive numbers on successive cards, to repeat numbers for a plurality of reciprocations, or to print the same number indefinitely. In Fig. 19 has been shown, one position in which a number may be impressed by the device 150. Since all the cards passing through the machine are punched alike it may be desirable where a particular punched field indicates a class designation to print such designation in the position shown in Fig. 19 on each card. To do so the device 150 is simply set in its "repeat" position after the particular number has been set therein in a well known manner.

The relatively stationary member of the device is secured in a casting 152, attached to the base of the machine by screws as shown in Figs. 1, 3 and 5. A rod 153 is mounted for vertical reciprocation in casting 152 and connected at its upper end to the printing wheels and their associated mechanism. A spring 154 tends to hold the rod in its lower position and the operation of the device is such that upward movement of rod 153 impels the wheels 151 against the card to make an impression thereon and, if set for consecutive numbering, on the return stroke of rod 153 the units wheel will automatically be moved to the next higher digit.

In the present invention the numbering device is adapted to function only when a card is in register in position 17. The lower end of rod 153 has connection with an arm 155 secured to a shaft 156. An arm 157 also fixed on shaft 156 has connection with a yoke 158 drilled to a threaded rod 159. A spring 160 and lock nuts 161 form a resilient connection between rod 159 and yoke 158. The other end of rod 159 is threaded in a member 162 which is slidable in a member 163 whose end forms part of an eccentric strap around eccentric cam 164 secured to shaft 22. A screw 166 cooperates with a slot in member 162 to prevent turning within member 163.

A key 165 vertically slidable in member 163 is adapted to cooperate with a suitable keyway in member 162 to form an integral unit of 162 and 163 so that for each revolution of shaft 22 arm 157 is rocked to the left and back again provided block 165 remains in the position of Fig. 5. This causes a similar rocking of arm 155 to cause printing upon the card and setting of the next number. Key 165 has upwardly extending arms 166 which carry a roller 167 and are urged downwardly by a spring 168. Roller 167 fits in a notch 169 of like conformation in a slide 170 (see also Fig. 20). As long as cards are successively advanced to printing position the parts maintain the relationship of Fig. 5 wherein slide 170 moves with member 163. An interposer 171 pivoted at 172 (see Fig. 9) lies normally out of the path of a roller 173 mounted on slide 170 held thus by a spring 174. Integral with interposer 171 is the armature 175 of magnet 176 which when energized moves interposer 171 to the dotted line position of Fig. 9 where it lies in the path of roller 173.

Figure 20:
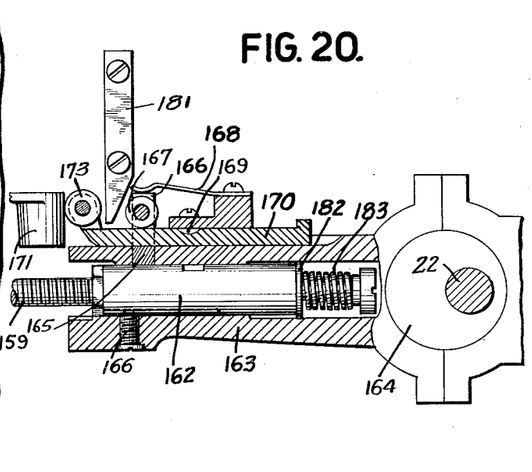
Fig. 20 is a position view of parts in Fig. 5.

When a card is in printing position as in Fig. 5 it maintains a card lever 177 in raised position as shown. Lever 177 is secured to a rod 178 (see also Fig. 10) at whose extremity is fastened an arm 179 having its free end insulated and bearing upon the lower blade of a contact 180 to hold it open. Contact 180 is in series with magnet 176 and permits current to flow therethrough only if a card fails to feed to printing position. In such event the interposer 171 will lie in the path of roller 173 (Figs. 5 and 9) so that as the member 163 is moved to the left by eccentric cam 164 roller 173 will be stopped by interposed 171 and the continued advance of member 163 carrying key 165 and roller 167 will cause the notch 169 to cam the roller 167 and key 165 upward out of cooperation with member 162. At the end of the first half revolution of cam 164 the parts will be in the position as shown in Fig. 20. During the return stroke of member 163 roller 173 will strike a fixed bar 181 to retard the slide 170 while the member 163 returns to the position of Fig. 5 where key 165 will again drop into member 162. A resilient connection comprising a collar 182 and spring 183 takes up any shock or overthrow as member 163 picks up member 162 during its travel to the right.

Card lever 177 is sufficiently long to span the space between successive cards so that contact 180 remains open as long as cards are feeding one after another.

A platen 184 hinged at 185 is locked in position by handles 186 pivoted to a fixed part of the frame and having an eccentrically located pin in its hub which fits in an opening in the platen 184. Movement of handle 186 axially away from platen 184 will withdraw the pin from locking position and the platen may then be raised to permit access to the printing device for setting purposes. A suitable rubber insert is carried by platen 184 directly above the wheels 151 to cushion the printing blow of the device.

Figure 16:
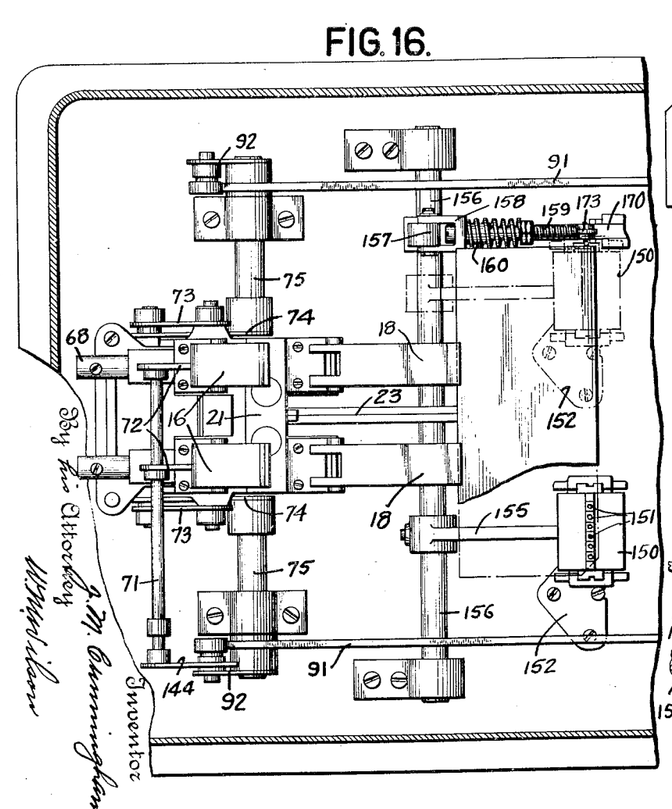
Fig. 16 is a detail showing the various locations of the numbering device.
Figure 17:
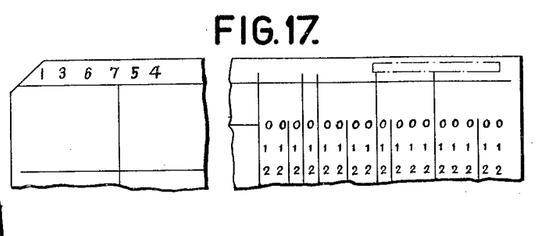
Fig. 17 is a fragment of a card.

In Fig. 16 the printing head 150 is shown in a position to print upon the long margin of the card in the manner illustrated in Fig. 17. For this purpose arm 155 is slid along shaft 156 to the desired location and bracket 152 is turned about rod 153 and screwed to the base of the machine as shown.

Figs. 6 and 10 show card levers 187 integral with a sleeve 188 which carries an arm 189 adapted to close a contact 190. Levers 187 are to cause closure of contacts 190 as a card enters the printing position 17 and to open the contacts when the card arrives in register. Referring to Fig. 18, contact 190 is in series with counter magnet 119 so that each closure of the contact causes an actuating stroke of the card counting mechanism while the motor is running and relay contacts 115 are closed. The circuit follows from line 110, magnet 119, contact 190, magnet 112, contacts 115, contacts 117, 118 to line 114.

A switch 191 is provided to render the printing mechanism ineffective where it is desired to punch cards without printing thereon. With switch 191 closed a circuit is established while the motor is running, from line 110, magnet 176, switch 191, magnet 112, contacts 115, and thence alternately through contacts 116 and A; and contacts 117, 118 to line 114. Energization of magnet 176 as has been heretofore explained prevents the effective operation of the printing head 150.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

I claim:

1. In a machine of the class described, means for feeding a record card to printing position, means for counting the number of cards passing to said printing position, an operating mechanism therefor controlled by an electric circuit, and means controlled by the card in printing position for rendering said circuit effective.

2. In a machine of the class described, means for successively feeding cards to printing position, means for separately advancing cards from printing position to punching position, means controlled by the presence of a card in printing position for effecting a printing operation and means controlled by a card in punching position for causing said advancing means to feed a card from printing position to punching position.

3. In combination, a printing position adapted to receive a record card, printing mechanism normally coupled to a continually running actuator, magnetically controlled means for causing uncoupling of said mechanism and said actuator, and a contact adapted upon failure of a card to register in said printing position to cause operation of said uncoupling means.

4. In a machine of the class described, means for feeding a record card to printing position, a serial numbering device, an actuator therefor, a key normally coupling said device to said actuator, and means controlled by the failure of a card to register in said printing position to cause movement of said key to inoperative position upon advance of said actuator.

5. In a machine of the class described, means for feeding a record card to printing position, a serial numbering device, an actuator therefor, a key normally coupling said device to said actuator, and means controlled by the failure of a card to register in said printing position to cause movement of said key to inoperative position upon advance of said actuator, and means for returning said key to coupling position upon return movement of said actuator.

6. A machine comprising a card magazine, a printing device, punching devices and a stacker for punched cards, a picker for withdrawing cards from the card magazine and directly placing the same in cooperation with said printing device, a pusher for advancing the card from said printing device to said punching devices, a gripper for withdrawing the card from said punching device to said stacker and means for concurrently operating said picker, pusher and gripper.

7. In combination, a printing position adapted to receive a record card, printing mechanism normally coupled to a continually running actuator, magnetically controlled means for causing uncoupling of said mechanism and said actuator, a contact adapted, upon failure of a card to register in said printing position to cause operation of said uncoupling means and means operable at will to effect an operation of said uncoupling means independently of said contact.

8. In a machine of the class described, having a feed magazine, a printing device and a punching device, means for feeding a card from said magazine to each of said devices in order during successive cycles of operation of the machine and means controlled by said punching device for keeping the feeding means in operation until the card has been fed through both of said devices.

In testimony whereof I hereto affix my signature.

JAMES MASON CUNNINGHAM.